Nov. 2, 1926.
E. L. SCHUMACHER ET AL
TEMPLE
Filed March 31, 1923
1,605,474
2 Sheets-Sheet 1
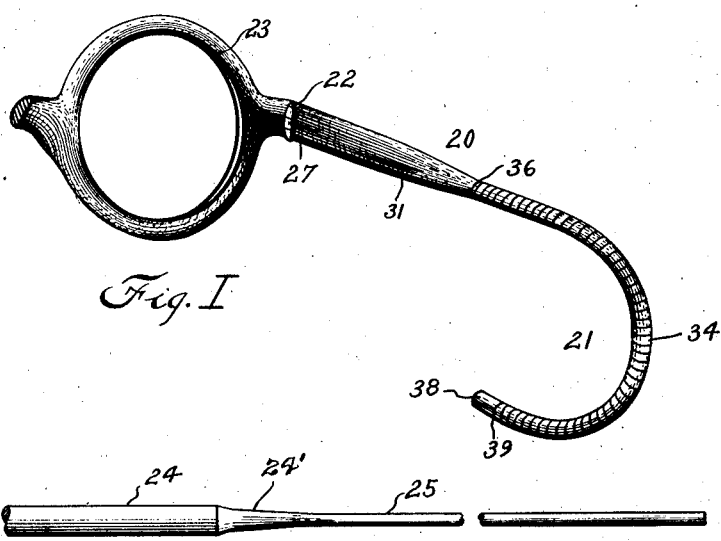
Fig. I
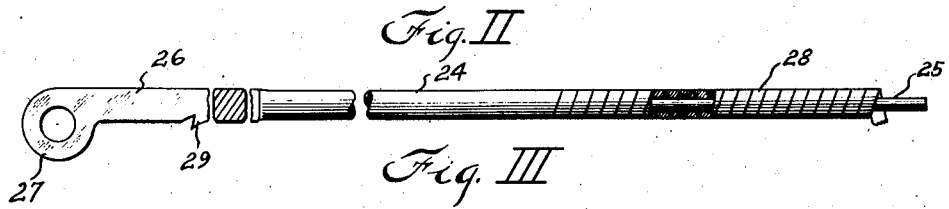
Fig. II
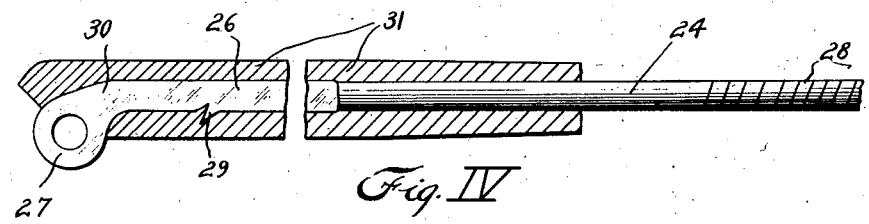
Fig. III
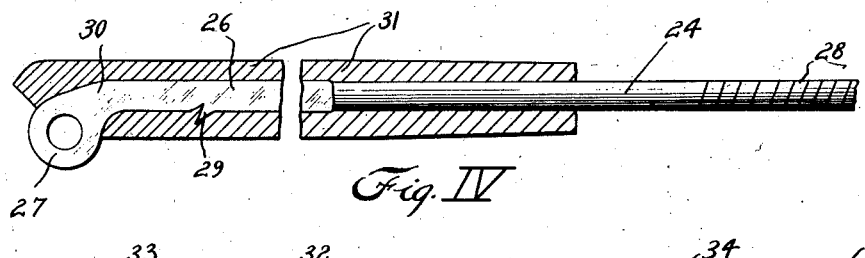
Fig. IV
Fig. V    Fig. VI
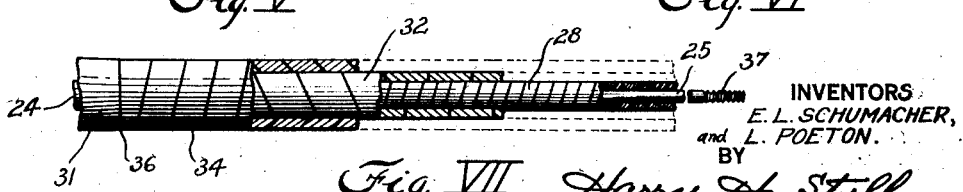
Fig. VII
INVENTORS
E. L. SCHUMACHER,
and L. POETON.
BY
Harry H. Styll
ATTORNEY

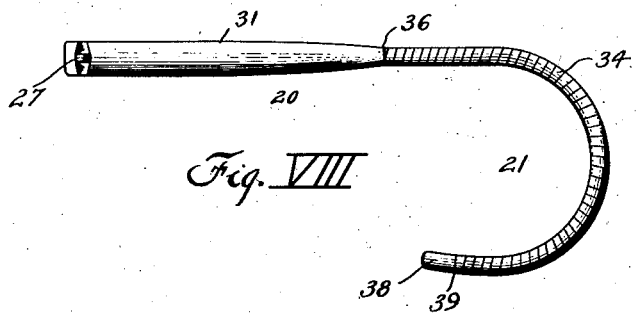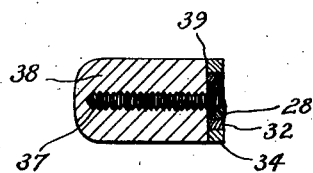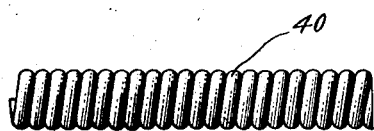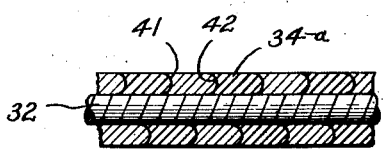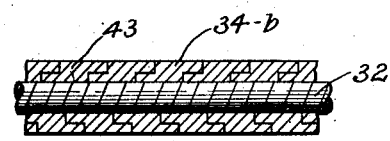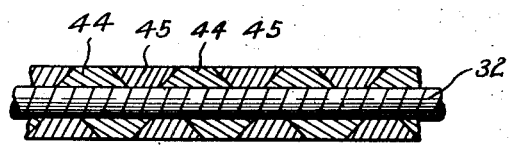

Patented Nov. 2, 1926.

1,605,474

UNITED STATES PATENT OFFICE.

ELMER L. SCHUMACHER AND LAWRENCE POETON, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

TEMPLE.

Application filed March 31, 1923. Serial No. 628,963.

This invention relates to improvements in temples, and has particular reference to temples for spectacles made of composition material, such as zylonite.

One object of the present invention is to produce a temple for "all-zyl" frames with a flexible ear loop which will not cut or abrade the skin, or catch the hair of the wearer.

A further object is to provide such a temple with an inflexible straight portion, for pivotal connection to the lens frame, and a flexible ear loop secured thereto.

A further object is to provide a temple of composition material with a metallic core extending throughout its entire length.

A further object is to provide a composition temple with a flexible ear loop of spirally wound material, the adjacent turns of the winding intermeshing with one another.

A still further object is to produce a composition temple with a flexible ear loop which will retain its shape, be strong and durable in service, and a general improvement in the art.

Other objects and advantages will be apparent from the following description taken in connection with the accompanying drawings, forming a part of the specification.

In the drawings:—

Figure I is a perspective view of a temple embodying the invention.

Figure II is an elevation of the wire forming the primary core used in the manufacture.

Figure III is an elevation showing the secondary core and hinge member secured to the wire, parts being in section.

Figure IV is a longitudinal sectional view showing the zylonite on the inflexible portion.

Figures V and VI are component parts of the spirally wound material covering the ear loop.

Figure VII is a detail view of the temple partly assembled, parts being broken away and parts in section.

Figure VIII is a side elevation of the finished temple.

Figure IX is a detail sectional view of the tip used on the end of the ear loop.

Figure X is an elevation of a modified form of ear loop cover.

Figures XI and XII are sectional views of modified forms of spiral winding.

Figure XIII is a similar view wherein two strips of material are spirally wound together.

Figure XIV is a view similar to Figure X of another modified form.

The desirability of zylonite temples lies in the fact that, because of their light weight, they can be made sufficiently thick to avoid cutting the skin behind the ear. Furthermore, the nature of its surface is such as to be extremely comfortable to the wearer, and it is not affected by perspiration, as is metal. The objection to zylonite temples heretofore made is due to the fact that zylonite has the peculiar property of returning to its initial set, and therefore the zyl temples with bent ear loops fail to retain their shape. With our invention we provide a temple having all the desirable qualities of zylonite, without the objectionable features thereof.

Similar reference characters designate corresponding parts throughout the several views. The numeral 20 designates our improved temple having the flexible ear loop 21. The temple is hingedly connected as at 22 to a composition lens rim 23 of a spectacle of any desired form. It will be well to state at this point that in using the word "composition" we mean a material simulating the appearance of tortoise shell, but we do not wish to be understood as limiting ourselves to zylonite, as other composition materials will serve equally well.

In the manufacture of our improved temple we use a metal wire having a cylindrical body portion 24 and a reduced end portion 25 on one end. On the other end of the body portion 24 we secure by soldering, welding, or any other manner, a square shanked hinge member 26 having an enlarged eye 27 for engagement with the bifurcated barrel hinge 22. On the reduced end 25, we secure as by soldering and swaging, a closely wound cable 28, the wire 25 projecting a short distance beyond the end of the cable. Thus we produce a metal core having a substantially stiff portion, formed by the body 24 the tapered portion 24' and shank 26, and a flexible portion formed by the reduced end 25 and cable 28 which is wound on the reduced end 25 and the tapered portion 24', which tapered portion produces a section of gradually reducing stiffness for the cable portion, so that the flexing strain does not come all at one point where the cable leaves the body portion 24. If desired the hinge shank 26 may be provided with barbs 29, and the eye 27 may be offset as at 30 in Figure IV.

The metal core is then partially encased in zylonite 31 or other composition material, this being done by molding or by inlaying it in two suitably grooved halves and cementing the two halves together. It will be noticed that the stiff portion 24 extends partly beyond the zylonite casing. This casing 31 may be made, as shown, tapering from an approximately rectangular cross section with rounded corners at the hinge end, to a circular cross section at the other end.

We then form a flexible tubing 32 by closely winding a thin strip of zylonite on a mandrel. This zylonite is preferably of rectangular cross section, as shown at 33, and the winding is of a suitable internal diameter to fit on the core 28. A second flexible tube 34 is made of thin zylonite, preferably of a parallelogram in cross section, as at 35, and is wound in the opposite direction from the tube 32 and of a size to slide snugly over it. Because the edges of the zylonite strip are bevelled and parallel to one another the contacting edges of adjacent turns will be co-mating. The tube 32 is then pushed into tube 34 and the two cemented together; after their ends are squared they are assembled over the core 28, as shown in Figure VII, and cemented at 36 to the casing 31.

The extreme end of the wire 25 is provided with screw threads 37 for holding a zylonite tip 38, the inner end of the tip being cemented to the adjoining end of the flexible zylonite tubing as at 39. The flexible end is then bent into the loop 21, and after polishing is ready for use. The two windings 32 and 34 give the proper amount of resiliency, and due to the fact that they are both wound in opposite directions the tendency to spring out of shape will be greatly lessened. It will also be noticed that the adjoining turns of material in the member 34 will intermesh with one another, and when bent will not open up or tend to pull the hair of the person wearing the temple. Since the body 24 of the core extends partly into the spirally wound zylonite 32, 34, flexture is not possible at the cemented joint 36; thus a strong joint is assured at what would otherwise be a point of weakness.

In place of the zylonite winding 32 we may use a closely wound coil 40 of wire, shown in Figure X. This wire may be of aluminum or other light weight metal and will be wound in the opposite direction from the zylonite coil 34.

In Figure XI we have shown a modification of the outer zylonite coil 34. In this form the flexible tube 34ᵃ is composed of this zylonite closely wound, and having its edges oppositely curved, that is, one edge has a concave curvature 41 and the other edge has a convex curvature 42. With this arrangement each successive turn will intermesh with the preceding turn forming co-mating edges which allow a rocking movement of adjacent turns without possibility of the joints opening up.

Figure XII shows another form, wherein the flexible cover 34ᵇ is composed of spirally wound zylonite of cross-sectional configuration 43, commonly known as the "wall of Troy". In this construction the successive turns of material are interlocked, forming a specially strong covering, with the proper flexibility and resiliency.

Another modification of flexible zylonite covering is shown in Figure XIII, wherein two strips of material 44 and 45 are wound together, both strips having a cross sectional configuration of an equilateral trapezoid. The two strips are assembled together with their bases oppositely disposed, as clearly shown in the drawing. The structures illustrated in Figures XI, XII and XIII may be used directly over the metallic core 28, or they may be used with either of the intermediate windings 32, 40 or 46.

The winding 46, shown in Figure XIV, may be used intermediate the core 28 and the outer cover 34. In this modification the material is aluminum or other light weight metal, substantially thin, and wide in proportion, the edges being rounded as at 47. In this winding a slight space is left between the different turns, thus making an especially flexible member with straight sides.

From the foregoing description taken in connection with the accompanying drawings, it will be evident that we have produced a composition temple for eyeglasses which will not cut or abrade the skin behind the ear of the wearer, the ear loop being of such a construction as to combine mechanical strength, resiliency, and the property of maintaining the shape into which it is bent. We do not limit ourselves to the exact details of construction herein shown and described, but reserve the right to make changes falling within the scope of the appended claims without departing from the spirit of the invention.

Having thus described our invention, what we claim is:

1. In combination with a spectacle, a temple having a metallic core extending throughout its length, a composition covering thereon, a portion of said covering being formed of a plurality of helical windings, the material of the outer windings having angularly disposed comating edges.

2. In a spectacle temple having a straight side portion and an ear loop, a metallic core extending the full length of the temple, a stiff composition casing on the major part of the straight side portion, a flexible casing secured to said stiff casing and covering the ear loop, said flexible casing comprising oppositely wound helixes, the outer helix being formed of material having comating edges, and means for securing the outer end of the flexible casing to the extremity of the metal core.

3. A spectacle temple comprising a metal core extending substantially throughout the entire length of the temple, a composition covering on said metal core, a portion of said covering being rigid, and the remaining portion being resilient, said resilient portion comprising an outer helically wound strip of composition material having comating edges, and an intermediate helix oppositely wound, and means for securing the outer ends of the helixes to the extremity of metal core.

4. A spectacle temple comprising a metal core, said metal core having an inflexible body portion and a flexible end, a composition casing surrounding the core, that portion of the casing which surrounds the flexible end of the core being resiliently formed of inner and outer spirals wound in opposite directions, the material of the outer spiral having straight sides and interlocking edges, and means for securing the end of the resilient casing to the extremity of the core.

5. In a spectacle temple having a straight side portion and an ear loop, a metal core comprising an inflexible body portion and a flexible cable secured to the end thereof, a composition casing surrounding the inner end of the body portion, a composition cable secured to said casing and surrounding the flexible end of the body portion, said composition cable being formed of an inner helical winding substantially rectangular in cross section and an outer helical winding in the opposite direction, the adjoining edges overlapping, and a cylindrical composition tip secured to the extremity of the metal core to hold the composition cable thereon.

6. In a spectacle temple having a straight side portion and an ear loop, a metal core comprising an inflexible body portion and a flexible cable rearwardly extending therefrom, a composition casing surrounding the forward end of the body portion, and a composition cable secured to said casing and covering the rearward end of the body portion and the flexible cable, said composition cable being formed of a plurality of oppositely wound helixes, the material of the outer winding having comating edges.

7. In a device of the character described, a non-spiral stiff non-metallic side portion, a stiff metal portion beyond the end of the non-spiral stiff non-metallic portion, a flexible metallic spirally coiled portion beyond the stiff metal portion, and a flexible spirally coiled non-metallic portion over the stiff metallic portion and over the flexible spirally coiled metallic portion forming a flexible cable ear loop beyond the stiff metallic portion and a stiff support for the non-metallic spiral cable portion at its junction with the non-spiral stiff non-metallic portion.

8. In a spectacle temple of the character described, a flexible ear loop comprising a plurality of non-metallic cables wound in opposite directions.

9. In a spectacle temple of the character described, a flexible ear loop comprising a metal cable and a plurality of non-metallic cables wound thereon, the helixes of which are wound in opposite directions.

10. A temple including a metallic core, a non-metallic composition covering thereon, the rearward portion of said covering being formed of concentric helixes of opposite directions, the material of the outer helix having bevelled edges.

11. A device of the character described comprising a solid non-metallic piece, a cable non-metallic piece attached thereto, a metal core extending entirely through said non-metallic members and terminating in a hinge fitting at one end and a cable portion at the other end, with a solid uncut portion extending beyond the end of the solid non-metallic piece ad extending into the cable non-metallic part.

12. An ear loop for a temple comprising an inner metallic cable and a plurality of non-metallic cables covering same, the edges of the outer cable being suitably formed to provide co-mating edges which work one on the other when the loop is flexed.

13. A spectacle temple comprising a metallic core having a straight stiff portion and a flexible cable portion beyond the stiff portion, a non-metallic covering over the metallic core having an uncut stiff portion over the stiff portion of the core, and a flexible spirally cut cable over the cable portion of the core, the stiff portion of the core extending a short distance beyond the stiff portion of the cover to form a support for the flexible portion of the cover at the point where it leaves the stiff portion of the cover.

14. An ear loop for a temple of the character described comprising an inner metallic cable and an outer non-metallic cable covering the same, the edges of the outer cable being suitably formed to provide single angled, unbroken straight line surface co-mating edges which work one on the other when the loop is flexed.

15. In a spectacle temple of the character described, a flexible ear loop comprising a plurality of non-metallic cables wound one on the other and the edges of the coils of said cables being arranged in overlapping position.

16. In construction for temple bars and the like, in combination, a main body member of non-metallic material, a metallic core member extending rearwardly therefrom, and a covering for said core member comprising a plurality of non-metallic strips wound in interacting relation thereabout.

17. In construction for temple bars and the like, in combination, a main body member of non-metallic material, a metallic core member extending rearwardly therefrom said core having a flexible portion curved to form an ear piece and a relatively rigid portion adjacent said body member, a non-metallic covering about said core comprising a plurality of strips conjointly wound, and a non-metallic member adjacent the end of said core holding said covering in place.

18. A spectacle temple comprising a metallic core having a body portion, a reduced portion and a tapered portion between the two portions, a cable on the reduced and tapered portions, a non-metallic covering over the core, having a stiff portion over the body portion of the core and a flexible spirally wound cable over the cable portion of the core.

19. A spectacle temple comprising a metallic core having a straight stiff portion, and a flexible cable portion beyond the stiff portion, and a non-metallic covering over the metallic core having an uncut stiff portion over the stiff portion of the core and a flexible spirally cut cable portion over the cable portion of the core, the joint of the stiff and cable portions of the metallic core being offset with respect to the joint of the stiff and cable portions of the non-metallic covering.

20. In a device of the character described, a stiff non-metallic side portion, a metallic core portion extending beyond the stiff non-metallic portion having a spirally wound flexible portion removed from the stiff non-metallic side portion and a stiffer portion adjoining its connection to the stiff non-metallic side portion, and a spirally wound non-metallic covering over the metallic core portion beyond the stiff non-metallic side portion.

ELMER L. SCHUMACHER.
LAWRENCE POETON.